US006946640B1

(12) United States Patent
Kawamura

(10) Patent No.: US 6,946,640 B1
(45) Date of Patent: Sep. 20, 2005

(54) CONTROL CIRCUIT WITH CASCADED SENSOR BOARDS

(75) Inventor: Yasufumi Kawamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/553,044

(22) Filed: Apr. 20, 2000

(30) Foreign Application Priority Data

Apr. 23, 1999 (JP) ................................ 11/116083

(51) Int. Cl.[7] ............................................ H01J 40/14
(52) U.S. Cl. ............................................ 250/214 R
(58) Field of Search ...................... 250/553.12, 559.36, 250/559.4, 221, 222.1, 214 DC, 214 R; 361/733, 361/729, 760, 792, 803; 348/294, 295; 327/594; 358/443, 482, 514; 324/535, 755; 174/260

(56) References Cited

U.S. PATENT DOCUMENTS 4,856,091 A * 8/1989 Taska ......................... 398/166
5,575,686 A * 11/1996 Noschese .................... 439/620
5,864,253 A * 1/1999 Katakura et al. ........... 327/297
6,233,157 B1 * 5/2001 Yoon et al. ................. 361/760
6,252,780 B1 * 6/2001 Quinn ........................ 361/792

* cited by examiner

*Primary Examiner*—David Porta
*Assistant Examiner*—Davienne Monbleau
(74) *Attorney, Agent, or Firm*—Rabin & Berdo, P.C.

(57) ABSTRACT

A control circuit is used in an apparatus such as a printer in order to detect status and conditions of the apparatus. The control circuit includes a main control board and a plurality of sensor boards. The sensor boards are connected in cascade to define a signal path that run through the plurality of sensor boards. Each sensor board is connected to a corresponding sensor that detects a status or condition in the apparatus, and provides a sensor output of the corresponding sensor to the signal path. When the main control board provides an activation signal to the first one of the plurality of sensor boards, each sensor board provides the corresponding sensor output onto the signal path at a predetermined timing. The sensor boards provide their sensor outputs in the order in which their are cascaded. The main control board receives the sensor output at the predetermined timing, the sensor output signal being output in an order in which the plurality of sensors are connected in cascade.

8 Claims, 12 Drawing Sheets

CONTROL CIRCUIT WITH CASCADED SENSOR BOARDS

BACKGROUND OF THE INVENTION

1. Field of the Invention

The present invention relates to a control circuit for use in information processing equipment such as facsimile machines and printers.

2. Description of the Related Art

Information processing equipment such as facsimile machines and printers have a variety of sensors and switches incorporated therein. Such sensors include sensors that detect the presence and absence of recording paper and an original, and reflection type sensors that detect the positions of moving recording paper. Signals from a large number of sensors and switches mounted at various locations in the equipment are directed to corresponding input terminals of the I/O port over individual wires, and are directed to the CPU via the I/O port.

Therefore, a large number of cables and wires are used in the equipment and present design problems such as difficulty in routing wires, increasing assembly time, and obstacles to troubleshooting.

SUMMARY OF THE INVENTION

The present invention was made in view of the aforementioned drawbacks.

An object of the invention is to provide a control circuit in which a minimum number of cables and wires are used.

Another object of the invention is to provide a control circuit in which wires can be routed in a minimum assembly time without difficulty and are not obstacles to troubleshooting.

A control circuit is used in an apparatus such as a printer in order to detect status and conditions in the apparatus.

The control circuit includes a main control board and a plurality of sensor boards. The plurality of sensor boards are connected in cascade to define a signal path that runs through the plurality of sensor boards. Each of the plurality of sensor boards is connected to a corresponding sensor that detects a status or condition and provides a sensor output of the corresponding sensor to the signal path. The main control board is connected to a first one of the plurality of sensor boards and to a final one of the plurality of sensor boards. When the main control board provides an activation signal to the first one of the plurality of sensor boards, each of the plurality of sensor boards provides the sensor output onto the signal path at a predetermined timing. The sensor boards provide their sensor outputs in the order in which they are cascaded. The main control board receives the sensor output at the predetermined timing, the sensor output signal being output in an order in which the plurality of sensors are connected in cascade.

The control circuit may further include a sensor check circuit. The main control board provides the activation signal to the first one of the plurality of sensor boards to activate a cycle of receiving a train of sensor outputs from the final one of the plurality of sensor boards. The sensor check circuit determines whether the train of sensor outputs of a preceding one of the two consecutive cycles is different from the train of sensor outputs of a following one of the two consecutive cycles. If the two trains of sensor outputs do not coincide, the sensor check circuit provides an interruption signal to the main control board so that the main control board performs a predetermined control operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 4C is a side view;

DETAILED DESCRIPTION OF THE INVENTION

The present invention will be described in detail by way of example.

First Embodiment

{Overall Configuration}

Figure 1:
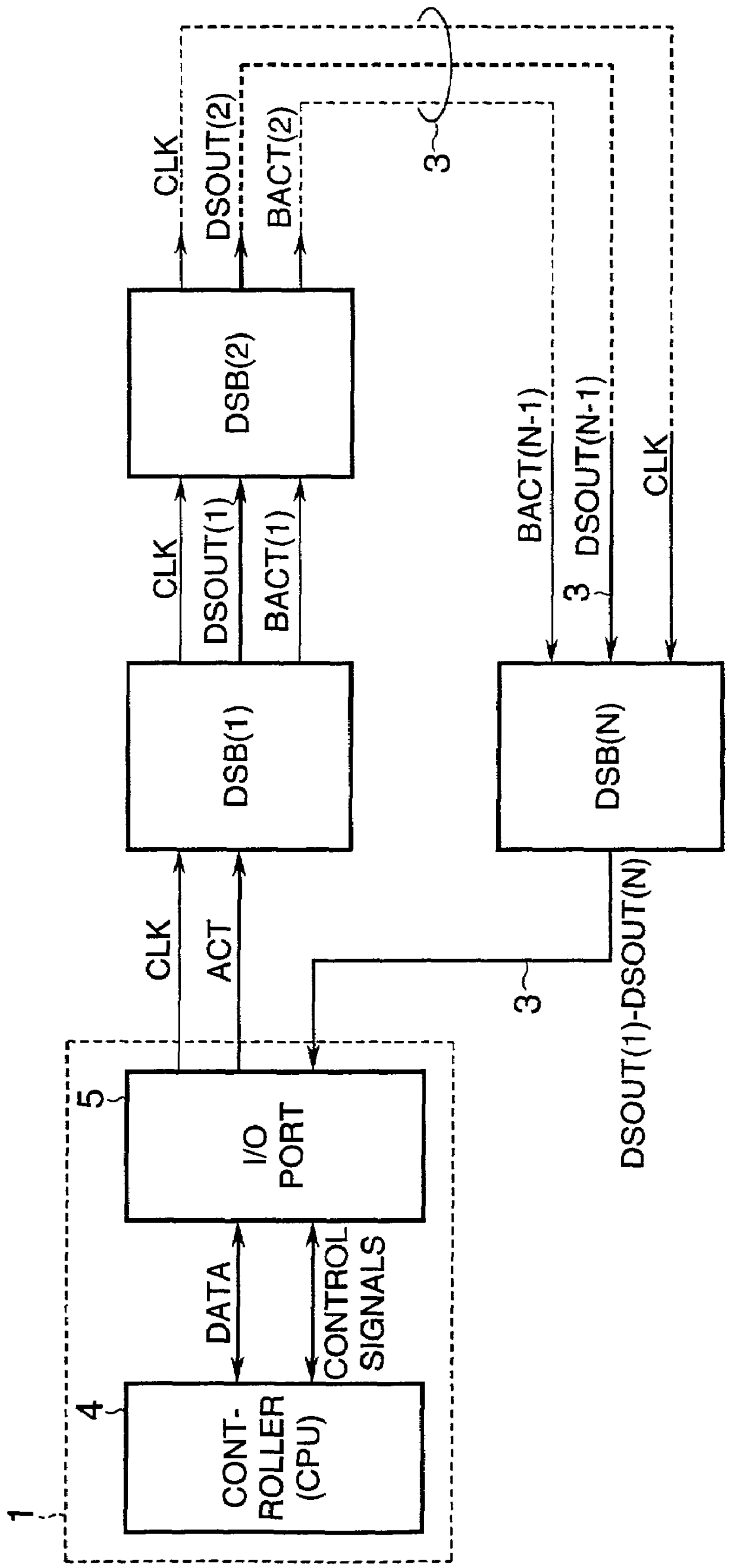
FIG. 1 is a block diagram illustrating the configuration of a first embodiment.

FIG. 1 is a block diagram illustrating the configuration of a first embodiment.

A control circuit according to the first embodiment includes a main control board 1, digital sensor boards DSB(1)–DSB(N), wires 3 that connect the digital sensor boards DSB(1)–DSB(N) in cascade. The main control board 1 includes a controller 4 and an I/O port 5 and performs the overall control of the controlling circuit. The controller 4 communicates data and control signals with the I/O port 5 through a bus. The digital sensor boards DSB(1)–DSB(N) are connected in this order.

The output port of the I/O port 5 is connected to the input of the first digital sensor board DSB(1) and the input port of the I/O port 5 is connected to the output of the final digital sensor board DSB(N). The controller 4 takes the form of a CPU that controls the entire circuit used in the equipment. The controller 4 provides an activation signal ACT to a first one of the digital sensor boards DSB(1)–DSB(N) connected in cascade, the activation signal ACT instructing to start reading the output of the respective sensors 11 (FIG. 2) connected to the digital sensor boards DSB(1)–DSB(N). The controller 4 also receives digital sensor output signals DSOUT(1)–DSOUT(N) from the final one of the digital sensor boards DSB(1)–DSB(N). Each cycle of the monitoring operation of the digital sensor boards DSB(1)–DSB(N) is activated by the activation signal ACT.

The I/O port 5 receives various control signals (e.g., activation signal ACT) from the controller 4 and transfers the received control signals to the digital sensor boards DSB(1)–DSB(N) and transfers the data (e.g., digital sensor outputs DSOUT(1)–DSOUT(N)) received from the digital sensor board DSB(N) to the controller 4. Each of the digital sensor boards DSB(1)–DSB(N) has a sensor controlling circuit connected to a sensor, and detects the presence and absence of, for example, the recording paper, an original, or the like.

{Configuration of the Sensor Board}

The configuration of the digital sensor board will now be described with reference to the figures.

Figure 2:
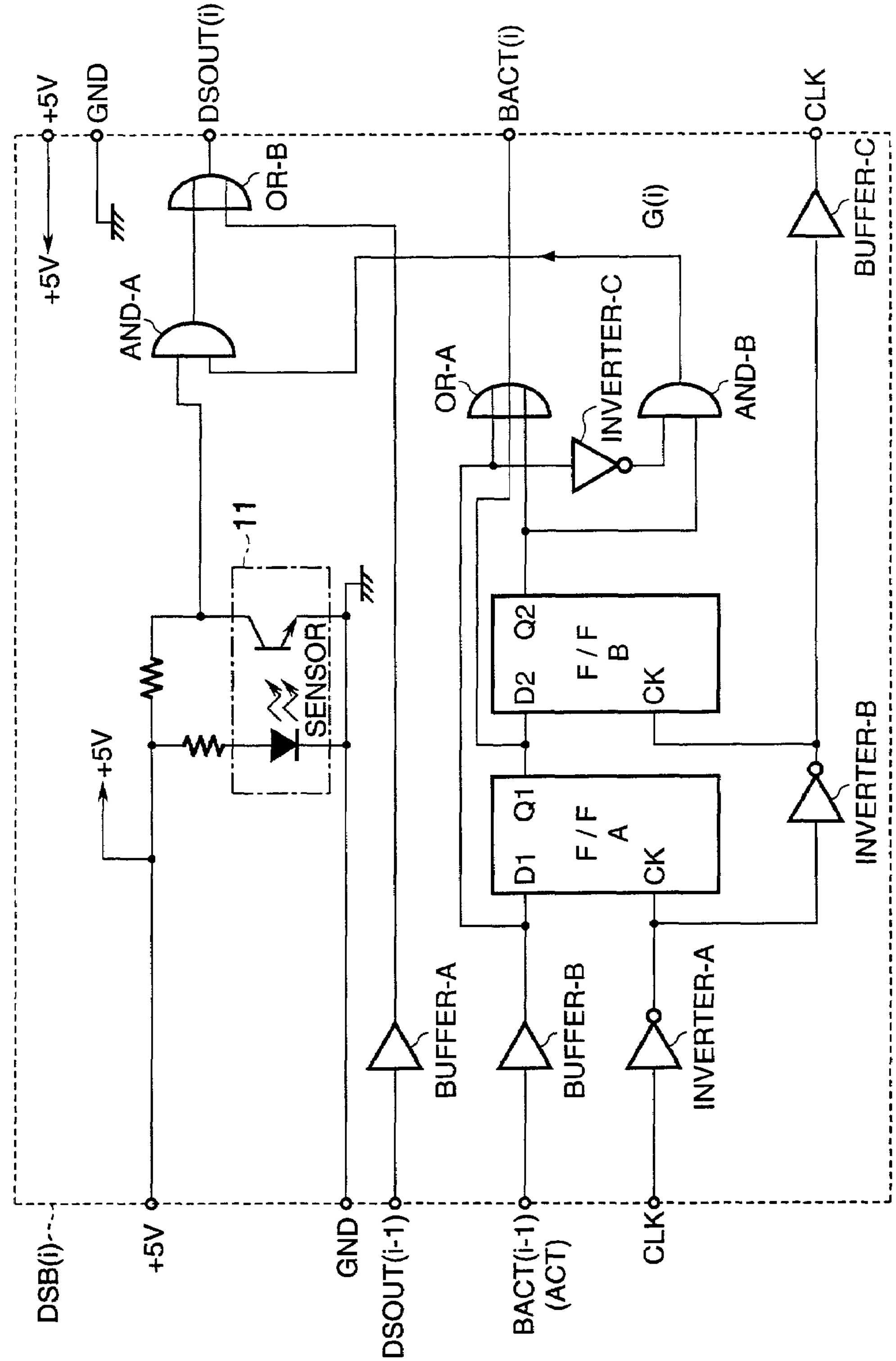
FIG. 2 is a schematic diagram of the digital sensor board of FIG. 1.

FIG. 2 is a schematic diagram of the i-th digital sensor board DSB(i) (i=1, 2, 3, . . . N).

Each of the digital sensor boards DSB(1)–DSB(N) includes a sensor 11, a flip-flop A, a flip-flop B, a buffer A, a buffer B, a buffer C, an inverter A, an inverter B, an inverter C, an OR gate A, an OR gate B, an And gate A, and an AND gate B. The digital sensor boards DSB(1)–DSB(N) are of the same configuration except for the sensors 11.

The sensor 11 detects a status or condition of the apparatus, for example, the present and absence of the recording paper, and provides a detection signal to the AND gate A. The output of the AND gate A is sent as a digital sensor output DSOUT(i) to the following sensor board (DSB(i+1)) through the OR gate B. The flip-flop A and OR gate A of the i-th digital sensor board DSB (i) receive a board active signal BACT(i−1) via the buffer B. The flip-flops A and B receive clocks CLK via the inverter A and inverter B, respectively, from the preceding digital sensor board DSB (i−1). The board active signal BACT(i) indicates whether the digital sensor board DSB(i) is active or inactive. The board active signal BACT(i) is of a logic 1 when the sensor board DSB(i) is active, so that the output of the AND gate A is outputted as a valid digital sensor output DSOUT(i) from the OR gate B.

Then, the flip-flop A, flip-flop B, and OR gate A cooperate to extend the duration of the received board active signal BACT (i−1) by a length of time equal to one clock and then provides the extended board active signal BACT (i) to the following digital sensor board DSB(i+1).

It is to be noted that the first digital sensor board DSB(1) receives the activation signal ACT from the main control board 1 while each of the digital sensor boards DSB(2)–DSB(N) receive the clock CLK and board active signals BACT(2)–BACT(N) from a corresponding preceding one of the digital sensor boards DSB(1)–DSB(N-1). The first digital sensor board DSB(1) generates the board active signal BACT(1) by extending the received activation signal ACT by a length of time equal to one clock, and then provides the thus produced board active signal BACT(1) to the second digital sensor board DSB(2).

The flip-flops A and B, the inverter C, and the AND gate B cooperate to produce a sensor gate signal G(i) during a board active signal BACT(i), i.e., a duration produced by extending the board active signal BACT(i−1) by one clock, and then sends the sensor gate signal G(i) to the AND gate A. The AND gate A is opened by the sensor gate signal G(i), thereby directing the output of the sensor 11 to the OR gate B. The OR gate B provides the output of the AND gate A as a digital sensor output signal DSOUT(i) to the next digital sensor board DSB(i+1).

The OR gate B also receives the digital sensor output signal DSOUT(i−1) through the buffer A from the preceding digital sensor board DSB(i−1). It should be noted that the OR gate B first outputs the digital sensor board DSOUT(i−1) and then the digital sensor output signal DSOUT(i). In other words, the digital sensor output signal DSOUT(i−1) received from the preceding digital sensor board DSB(i−1) passes through the OR gate B of the digital sensor board DSB(i) to the following digital sensor board DSB(i+1). Thereafter, the digital sensor board DSB(i) produces the digital sensor output signal DSOUT(i) and provides the digital sensor output signal DSOUT(i) to the following digital sensor board DSB(i+1). The inverter B inverts the clock CLK so that the flip-flop B is triggered by a clock CLK that is obtained by inverting the clock CLK supplied to the flip-flop A. Then, the clock CLK is output through the buffer C to the following digital sensor board DSB(i+1).

{Overall Operation of the Sensor Board}

The operation of the sensor board will be described with reference to FIGS. 1 and 2.

The main control board 1 provides the activation signal ACT and clock CLK to the digital sensor boards DSB(1)–DSB(N). The digital sensor board DSB(i) receives the board active signal BACT(i−1) from its preceding digital sensor board DSB(i−1) and subsequently provides the board active signal BACT(i) to its following digital sensor board DSB(i+1). In this manner, the digital sensor boards DSB(1)–DSB(N) outputs their board active signals BACT (1)–BACT(N) in concert, so that the buffers A and OR gates B of the digital sensor boards DSB(1)–DSB(N) define a signal path that runs through the digital sensor boards DSB(1)–DSB(N).

The digital sensor board DSB(1) provides its digital sensor output signal DSOUT (1) having a predetermined duration to the main control board 1 through the succeeding digital sensor boards DSB(2)–DSB(N). Then, the digital sensor board DSB(1) makes the board active signal BACT (1) invalid, i.e., logic level 0, thereby preventing the main control board 1 from receiving the digital sensor output signal DSOUT(1) thereafter. Thereafter, the digital sensor board DSB(1) waits for the next activation signal ACT.

The digital sensor board DSB(2) detects that the board active signal BACT(1) has been made invalid and then provides the digital sensor output signal DSOUT(2) having a predetermined duration to the main control board 1 through the succeeding sensor boards DSB(2)–DSB(N). Then, the digital sensor board DSB(2) makes the board active signal BACT(2) invalid, i.e., logic level 0, and will wait until the digital sensor board DSB(1) receives the next activation signal ACT from the main control board 1.

The digital sensor boards DSB(3)–DSB(N) will also perform the aforementioned operation in sequence. Thus, the main control board 1 receives the digital sensor output signals DSOUT(1) to DSOUT(N) in sequence from all of the plurality of digital sensor boards DSB(1)–DSB(N) which are connected in cascade.

{Detailed Operation of the Sensor Boards}

Figure 3:
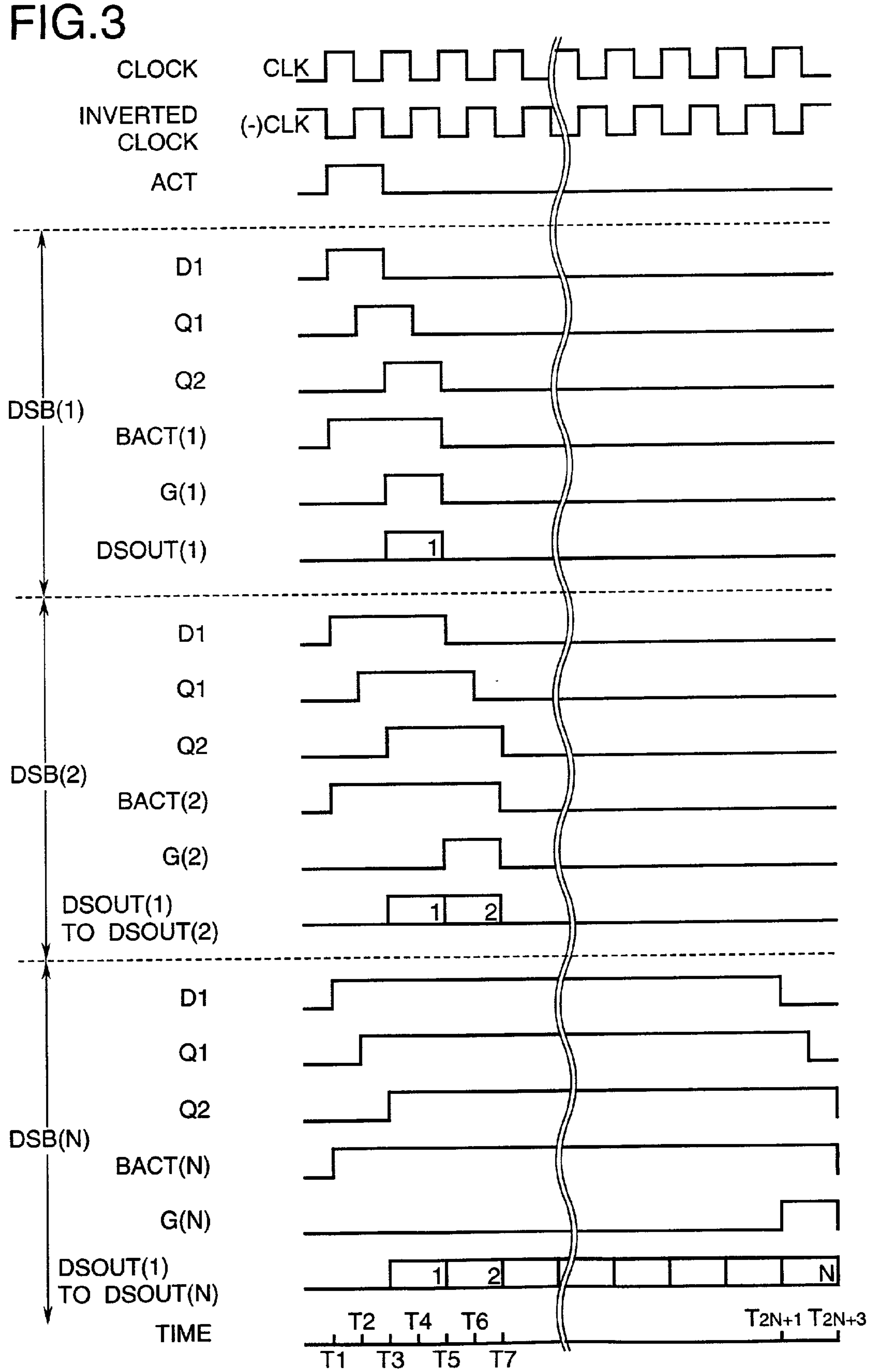
FIG. 3 is a timing chart illustrating the operation of the first embodiment.

FIG. 3 is a timing chart illustrating the operation of the first embodiment.

{Operation of the Digital Sensor Board DSB(1)}

The detailed operation of the sensor boards will be described with reference to FIGS. 2 and 3.

The digital sensor board DSB(1) will be described first.

At time $T_1$, the controller 4 of the main control board 1 provides the activation signal ACT via the I/O port 5 and wire 3 to the digital sensor board DSB(1). The activation signal ACT is fed through the buffer B to the input D1 of the flip-flop A and the input of the OR gate A. Thus, the input D1 and board active signal BACT(1) become a logic 1.

At time $T_2$, the flip-flop A is triggered on the rising edge of the inverted clock (–)CLK (i.e., output of the inverter A) such that the input D1 appears on the output Q1 of the flip-flop A. The output Q1 of the flip-flop A is then fed to the input D2 of the flip-flop B.

At time $T_3$, the flip-flop B is triggered on the rising edge of the clock CLK (i.e., output of the inverter B) such that the input D2 (i.e., Q1) appears on the output Q2 of the flip-flop B. The output Q2 is fed to the AND gate B and OR gate A. The activation signal ACT goes off at time $T_3$ with the result that the output (i.e., signal $Sg_1$) of the AND gate B goes high. The signal $Sg_1$ opens the AND gate A so that the output of the sensor 11 passes through the AND gate A and the OR gate B. The OR gate B provides the output of the sensor 11 as the digital sensor output signal DSOUT(1) to the following digital sensor board DSB(2).

At time $T_4$, the flip-flop A is triggered on the rising edge of the inverted clock (–)CLK (i.e., the output of the inverter A) so that the input D1 appears on output Q1. Since the activation signal ACT has gone off at time $T_3$, the resulting output Q1 is of a logic 0.

At time $T_5$, the flip-flop B is triggered on the rising edge of the clock CLK (i.e., output of the inverter B) such that the input D2 (i.e., Q1) appears on the output Q2 of the flip-flop B. In other words, the output Q2 is now of a logic 0. At this moment, the inputs to the OR gate A are all logic 0 such that the output of the OR gate A is logic 0. That is, the board active signal BACT(1) is made invalid (logic 0) and fed to the following digital sensor board DSB(2). At the same time, the output Q2 (logic 0) closes the AND gate B such that the sensor gate signal $Sg_1$ is of a logic 0.

{Operation of the Digital Sensor Board DSB(2)}

FIG. 3 illustrates the timing chart for the final digital sensor board DSB(N).

The operation of the digital sensor board DSB(2) will now be described with reference to FIGS. 2 and 3.

At time $T_1$, the digital sensor board DSB(1) receives the board active signal BACT(1) of a logic 1 from the digital sensor board DSB(1). The board active signal BACT(1) passes through the buffer B to the input D1 of the flip-flop A and to the OR gate A.

At time $T_2$, the flip-flop A is triggered on the rising edge of the inverted clock (–)CLK (i.e., output of the inverter A) such that the input D1 (logic 1) appears on the output Q1 of the flip-flop A. The output Q1 of the flip-flop A is then fed to the input D2 of the flip-flop B.

At time $T_3$, the flip-flop B is triggered on the rising edge of the clock CLK (i.e., output of the inverter B) such that the input D2 (i.e., Q1) appears on the output Q2 of the flip-flop B. The output Q2 is fed to the AND gate B and OR gate A. As described above, the activation signal ACT goes off at time $T_3$ and the gate signal G(1) of the preceding digital sensor board DSB(1) opens its AND gate A so that the output of the sensor 11 passes through the AND gate A and the OR gate B. However, with the second digital sensor board DSB(2), the board active signal BACT(1) that is input to the second digital sensor board DSB(2) is still valid at the time $T_3$, and therefore the AND gate B remains closed. Thus, the sensor gate signal D(2) is not sent to the AND gate A.

At time $T_4$, no change occurs.

At time $T_5$, the board active signal BACT(1) goes low so that the input D1 of the flip-flop A becomes a logic 0. As a result, the AND gate B provides the sensor gate signal G(2) to the AND gate A. The sensor gate signal G(2) opens the AND gate A, so that the digital sensor output signal DSOUT (2) passes through the AND gate A to the OR gate B. Then, the OR gate B provides the digital sensor output signal DSOUT(2) to the digital sensor board DSB(3).

At time $T_6$, the flip-flop A is triggered on the rising edge of the clock CLK (i.e., output of the inverter A) such that the input D1 appears on the output Q1 of the flip-flop A. In other words, the output Q1 now goes low.

At time $T_7$, the flip-flop B is triggered on the rising edge of the clock (i.e., output of the inverter B) so that Q1 appears on Q2. Thus, Q2 is now of a logic 0. At this moment, the inputs to the OR gate A are all logic 0, and the output of the OR gate A is of a logic 0 accordingly. That is, the board active signal BACT(2) is made invalid (logic 0) and fed to the following digital sensor board DSB(3).

At the same time, the AND gate B is also closed so that the sensor gate G(2) goes low. As a result, the digital sensor output signal DSOUT(2) also goes low. As described above, the operation of detecting the conditions of the sensors is carried out for the digital sensor boards DSB(1)–DSB(3) in sequence. Likewise, the operation is carried out for the digital sensor boards DSB(4)– DSB(N) subsequently.

The board active signal BACT(i) is extended in sequence by a length of time equal to one clock CLK in each of the digital sensor boards DSB(1)–DSB(N). The board active signal BACT (N+1) goes low at time $T_{2N+1}$. Then, the sensor gate signal G(N) goes high, so that the digital sensor board DSB (N) provides the digital sensor output signal DSOUT (N) to the main control board 1. Thus, the train of the digital sensor output signal DSOUT(1)–DSOUT(N) is supplied to the controller 4 via the I/O port 5.

The first embodiment has the following advantages.

(1) A plurality of sensor boards of simple construction are cascaded, thereby greatly reducing the number of wires and cables that are routed in the equipment.

(2) The construction eliminates the problems that routing wires and cables is difficult and increases the assembly time, and the wires and cables are obstacles to trouble shooting.

(3) Any number of sensor boards may be connected in cascade to meet specific design requirements without increasing the number of cables and wires.

(4) The construction requires fewer cables to be routed within the equipment so that less electromagnetic noise leaks from the cables.

Second Embodiment

In order that the first embodiment is practical, the digital sensor boards DSB(1)–DSB(N) should be small in physical size. A second embodiment is directed to miniaturizing the sensor board. In other words, the sensor boards according to the second embodiment take the form of an integrated circuit, i.e., IC type sensor board.

Figure 4A:
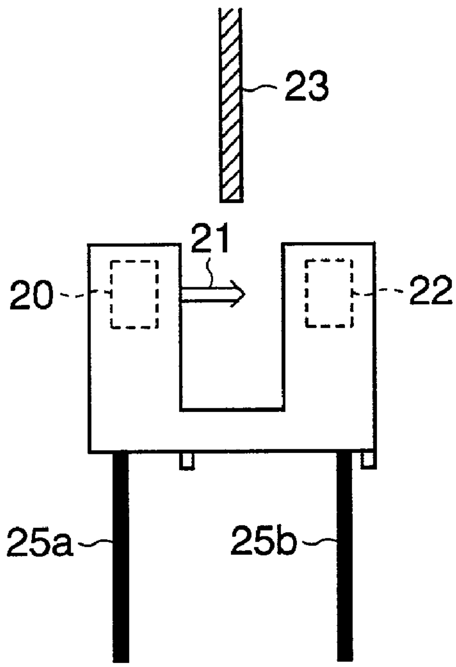
FIGS. 4A–4C illustrates an example of the construction of a photo interrupter of a second embodiment, FIG. 4A being a front view, FIG. 4B being a top view.
Figure 4B:
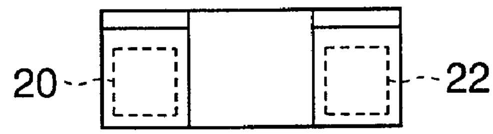
Figure 4C:
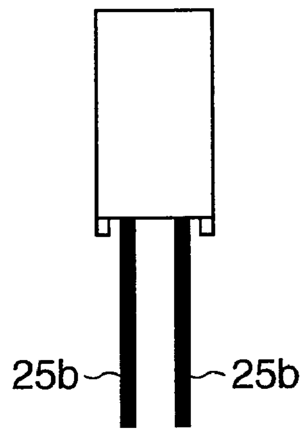

FIGS. 4A–4C illustrate an example of the construction of a photo interrupter.

FIG. 4A is a front view.

FIG. 4B is a top view.

FIG. 4C is a side view.

The photo interrupter shown in FIGS. 4A–4C corresponds to the sensor 11 of FIG. 2.

The photo interrupter incorporates a light emitting element 20 and a light receiving element 22 that receives the light beam 21 emitted by the light emitting element 20. When, for example, paper 23 passes through the photo interrupter to block the light beam 21, the photo interrupter detects the paper 23 to output a detection signal across pins 25*b*.

Figure 5:
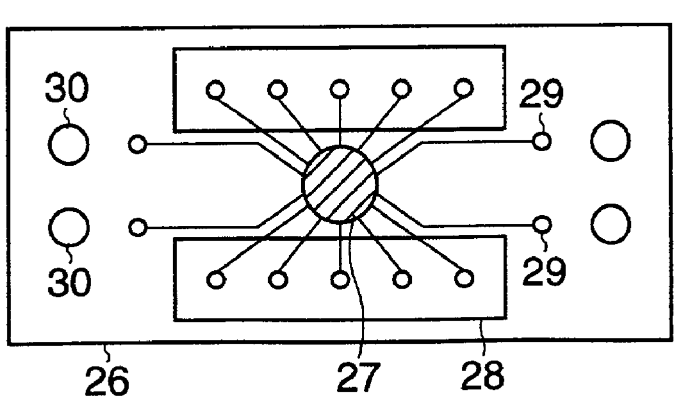
FIG. 5 illustrates a board on which an integrated circuit is mounted.

FIG. 5 illustrates a circuit board on which an integrated circuit (IC) is mounted.

The board 26 is a circuit board made of a material such as glass epoxy and carries a bare IC chip 27 thereon. The chip 27 includes all the circuit elements of the sensor board except for the sensor 11 in FIG. 2.

The chip 27 is electrically connected to connectors 28 by, for example, wire bonding and electrically connected to the equipment through the connectors 28. The board 26 has through-holes 29 formed therein, via which the photo interrupter is electrically and mechanically mounted to the board 26. The board 26 also has mounting holes 30 formed therein with which the board 26 is assembled to the equipment.

Figure 6:
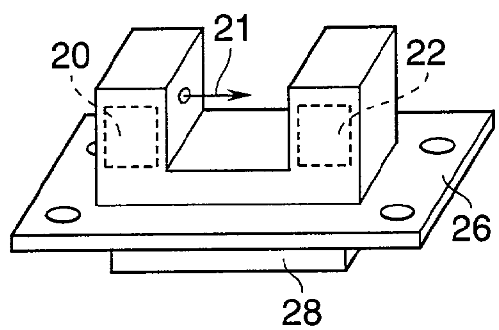
FIG. 6 is a perspective view of the IC type digital sensor board.

FIG. 6 is a perspective view of the IC type sensor board.

The second embodiment provides the following advantages.

(1) The use of the IC chip offers a small-size sensor board that facilitates wire-routing in the equipment. The IC type sensor board can be readily attached to and detached from the equipment, facilitating the maintenance of the equipment.

(2) The construction requires a lesser number of wires to be routed in the equipment, reducing electromagnetic noise emission from the wires.

Third Embodiment

CMOS type ICs are usually employed in the electrical circuits on the sensor board according to the first embodiment and on an IC type sensor board DSB(i) according to the second embodiment. One drawback of a CMOS type IC is that the circuit operation of the IC is susceptible to external noise due to its high input impedance.

A third embodiment is to solve the problem of high input impedance of a CMOS type IC. A terminator 43 in the form of a resistor matrix is connected to the input of the sensor board.

Figure 7:
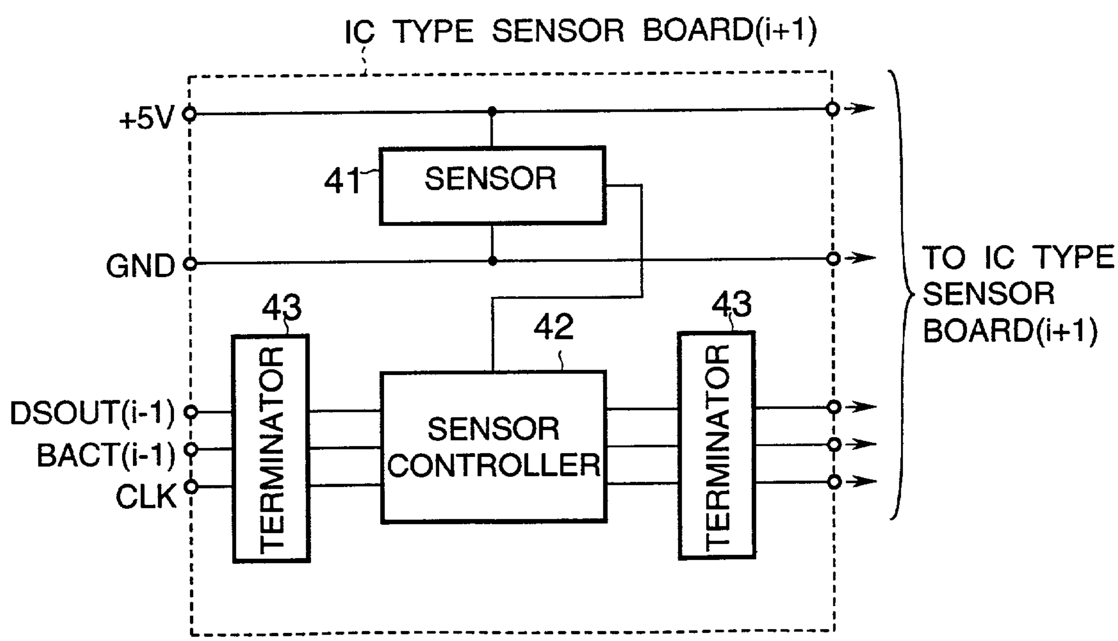
FIG. 7 is a block diagram of the digital sensor board according to a third embodiment.

FIG. 7 is a block diagram of the IC type sensor board DSB(i) according to the third embodiment.

The sensor board includes a sensor section 41, a sensor controller 42, and terminators 43. The sensor 41 corresponds to the section depicted by "11" of FIG. 2, or the photo interrupter according to the second embodiment.

The sensor controller 42 includes all the circuit elements of the sensor board of FIG. 2 except for the section "11", i.e., the sensor controller 42 is equivalent to the IC chip 27.

Figure 8:
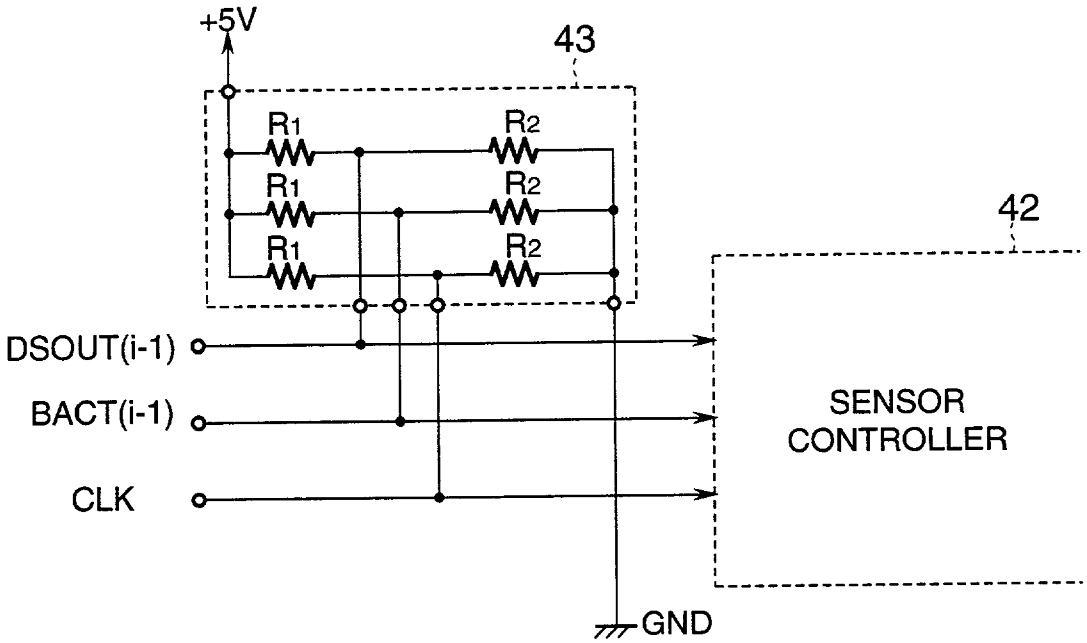
FIG. 8 is a schematic diagram of the terminator according to the third embodiment.

FIG. 8 is a schematic diagram of the terminator.

The terminator 43 includes a plurality of columns each of which is a series connection of resistors R1 and R2. Each column is connected between the power supply of +5V and the ground GND and the junction of the resistors R1 and R2 is connected to the input of the sensor controller 42. Thus, the high input impedance of the CMOS type IC is replaced by a resulting resistance given by (R1R2)/(R1+R2).

Thus, the operation of the sensor board according to the third embodiment is no longer susceptible to external noise. Although the terminator 43 has been described with respect to the input side of the sensor board, the terminator 43 may be applied to the output side of the sensor board.

Figure 9:
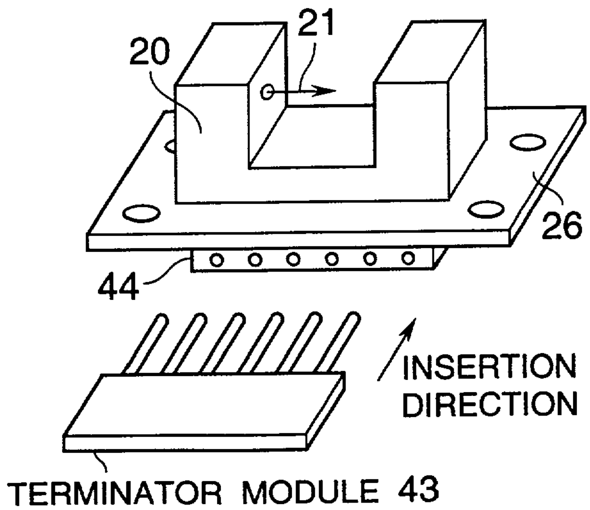
FIG. 9 is a perspective view of the IC type digital sensor board according to the third embodiment.

FIG. 9 is a perspective view of the IC type sensor board.

Referring to FIG. 9, the connectors 44 may be mounted on the IC type sensor board so that a module type terminator 43 may be inserted thereinto.

The third embodiment provides the following advantages.

(1) The use of the terminator implements low-impedance input of the sensor board, thereby preventing external noise from adversely affecting the operation of the sensor board.

(2) The module package of terminator can be readily attached to and detached from the sensor board, thereby preventing the manufacturing cost from increasing.

Fourth Embodiment

With the sensor boards according to the first embodiment, all the digital sensor output signals DSOUT(1)–DSOUT(N) of the digital sensor boards DSB(1)–DSB(N) are monitored at all times. This increases a load on the controller 4.

A fourth embodiment is to alleviate such a heavy task of the controller 4. The main control board of the fourth embodiment includes a memory 46 and a sensor check circuit 47.

First, the main control board provides the activation signal ACT to the first one of the plurality of sensor boards, thereby activating a cycle of receiving a train of sensor outputs from the final one of the plurality of sensor boards. The sensor check circuit 47 determines whether the train of sensor outputs of a preceding one of the two consecutive cycles is different from the train of sensor outputs of a following one of the two consecutive cycles. If the two trains of sensor outputs do not coincide, the sensor check circuit 47 provides an interruption signal INT to the controller 4, so that the controller 4 performs a predetermined control operation.

The train of the digital sensor output signals DSOUT(1)–DSOUT(N) is stored into the memory 46 every time the states of sensors of the sensor boards are checked at predetermined time intervals, so that the contents of the memory 46 are kept updated.

The sensor check circuit 47 compares the train of the most up-to-date digital sensor output signals DSOUT(1)–DSOUT (N) with that immediately preceding the train of the most up-to-date sensor output signals to determine whether the two trains coincide with each other. Upon detecting a mismatch, the sensor check circuit 47 provides an interruption signal Si (FIG. 11) to the controller 4, which in turn performs required operations in response to the interruption signal Si.

Figure 10:
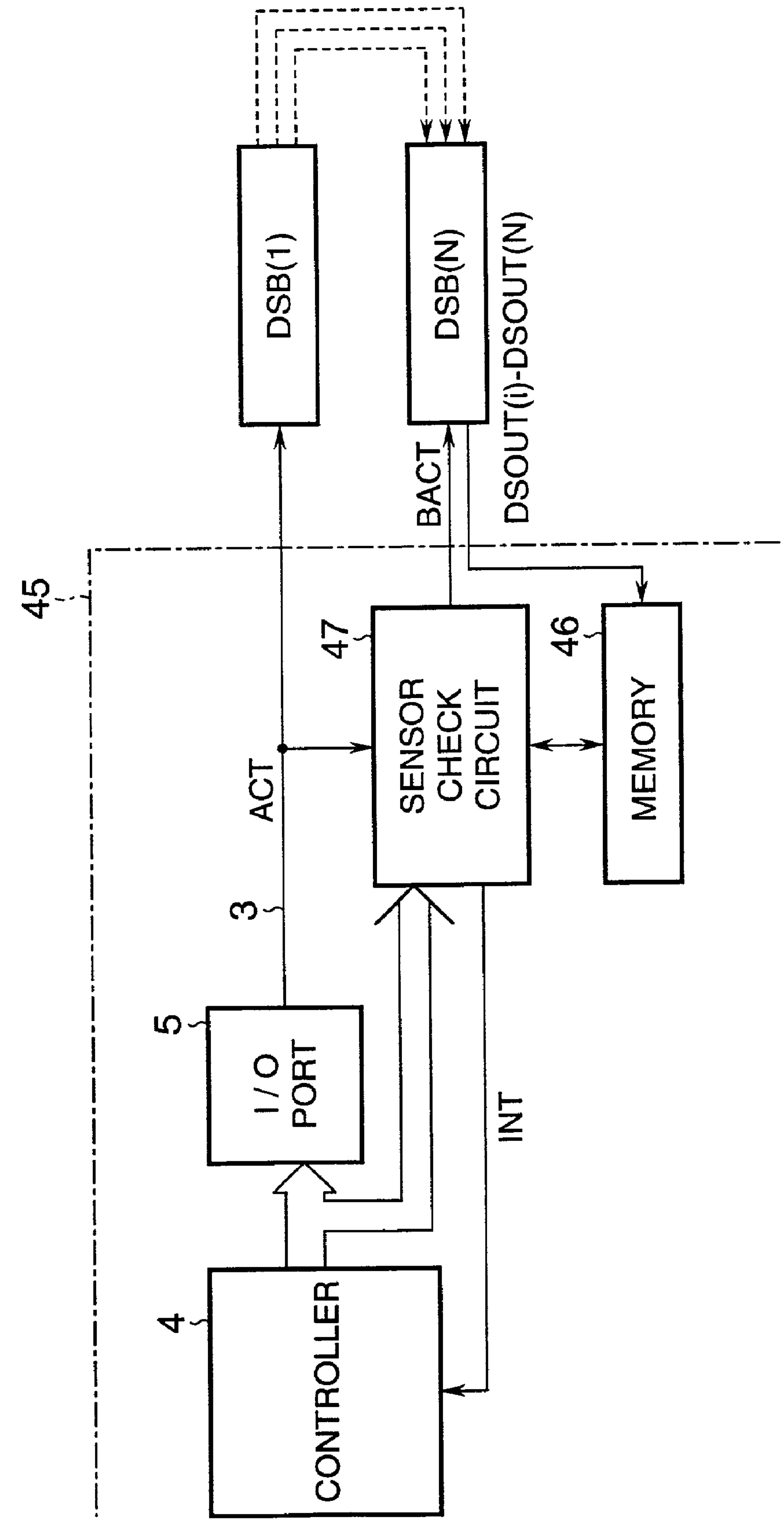
FIG. 10 is a block diagram illustrating a fourth embodiment.

FIG. 10 is a block diagram illustrating the fourth embodiment.

The control circuit according to the fourth embodiment includes a main control board 45, N digital sensor boards DSB(1)–DSB(N), and wires 3 that connect the digital sensor boards DSB(1)–DSB(N) in cascade. The main control board 45 includes a controller 4, an I/O port 5, a memory 46, and a sensor check circuit 47, and performs overall control of the control circuit. The controller 4 is connected to the I/O port 5 via a bus.

The inputs of the digital sensor board DSB(1) are connected to the output terminals of the I/O port 5 and the outputs of the digital sensor board DSB (N) are connected to the input of the sensor check circuit 47 and the memory 46.

The controller 4, I/O port 5, wires 3, and digital sensor boards DSB(1)–DSB(N) are the same as those of the first embodiment and description thereof is omitted. The memory 46 takes the form of a register that receives and temporarily stores the train of the digital sensor output signals DSOUT (1)–DSOUT(N). The sensor check circuit 47 checks the digital sensor output signals DSOUT(1)–DSOUT(N) to detect changes in sensor outputs.

{Memory 46 and Sensor Check Circuit 47}

Figure 11:
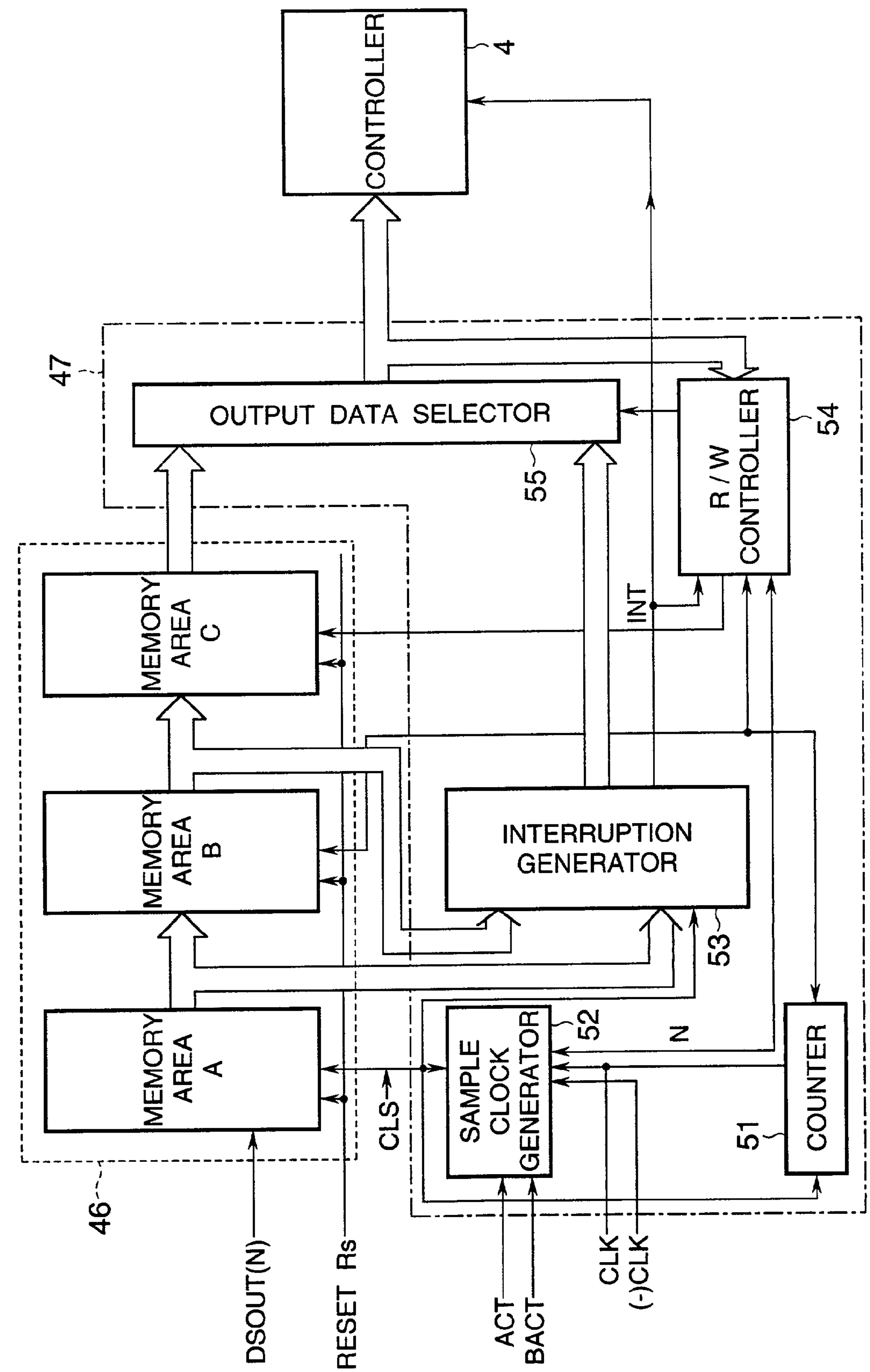
FIG. 11 is a block diagram illustrating the memory 46 and sensor check circuit 47 according to a fourth.

FIG. 11 is a block diagram illustrating the memory 46 and sensor check circuit 47.

The memory 46 includes memory area A, memory area B, and memory area C.

The memory area A receives and temporarily stores the train of the digital sensor output signals DSOUT(1)–DSOUT(N), which is received at predetermined intervals on the sensor sample clock CLS generated by the sample clock generator 52. The controller 4 generates the activation signal ACT which initiates a cycle in which the respective digital sensor outputs are monitored.

The memory area B temporarily stores the train of the sensor output signals immediately preceding that stored in the memory area A. A later described interruption generator 53 compares the content of the memory area A with the content of the memory area B to determine whether the contents coincide. If they do not coincide, the content of the memory area B is updated with the content of the memory area A.

The content of the memory area C is also updated with the content of the memory area A at the same time that the content of memory area B is updated with the content of the memory area A. In other words, the memory area C stores the most up-to-date train of the digital sensor output signals DSOUT(1)–DSOUT(N). The memory area C also transfers the updated contents to a later described output data selector 55.

The sensor check circuit 47 includes a counter 51, a sample clock generator 52, an interruption generator 53, a R/W controller 54, and the output data selector 55.

The controller 4 causes the R/W controller 54 to send a load signal to the counter 51 so that the counter 51 is set for a value N upon the load signal. The value N indicates the number of sensor boards DSB. Thus, the value of N describes the length of the train of digital sensor output signals DSOUT(1)–DSOUT(N). The counter 51 sets the number of pulses of the sample clock CLS to N, the sample clock CLS being generated by the generator 52. The number of pulses of the sample clock CLS determines the most significant digits of the contents of the memory areas A, B, and C.

The sample clock generator 52 outputs a write signal i.e., sensor sample clock CLS which is used to receive the train of the digital sensor output signals DSOUT(1)–DSOUT(N) from the digital sensor board DSB(N) at the predetermined intervals and store the train of the digital sensor output signals DSOUT(1)–DSOUT(N) into the memory area A. The sample clock generator 52 functions as a gate circuit that receives the clock CLK and inverted clock (−)CLK to produce the sensor sample clock CLS in timed relation with the digital sensor output signals DSOUT(1)–DSOUT(N) (FIG. 3). The timing at which this gate circuit is opened is controlled by the activation signal ACT and the timing at which the gate circuit is closed is controlled by the value N set by the counter 51.

Under the control of the sample clock generator 52, the interruption generator 53 compares the content of the memory area B with the content of the memory area A and provides an interruption signal INT to the controller 4 if they do not coincide.

Under the control of the controller 4, the R/W controller 54 sets the counter 51 for a predetermined number N, i.e., the number of digital sensor boards DSB(1)–DSB(N). Further, under the control of the controller 4, the R/W controller 54 controls the write timings at which data is written into the memory area B, memory area C, and a timing at which a later described output data selector 55 receives data.

Under the control of the R/W Controller 54, on the leading edge of the interruption signal INT, the output data selector 55 receives the most up-to-date train of sensor output signals DSOUT(1)–DSOUT(N) from the memory area C and transfers it to the controller 4.

{Operation of the Fourth Embodiment}

Figure 12:
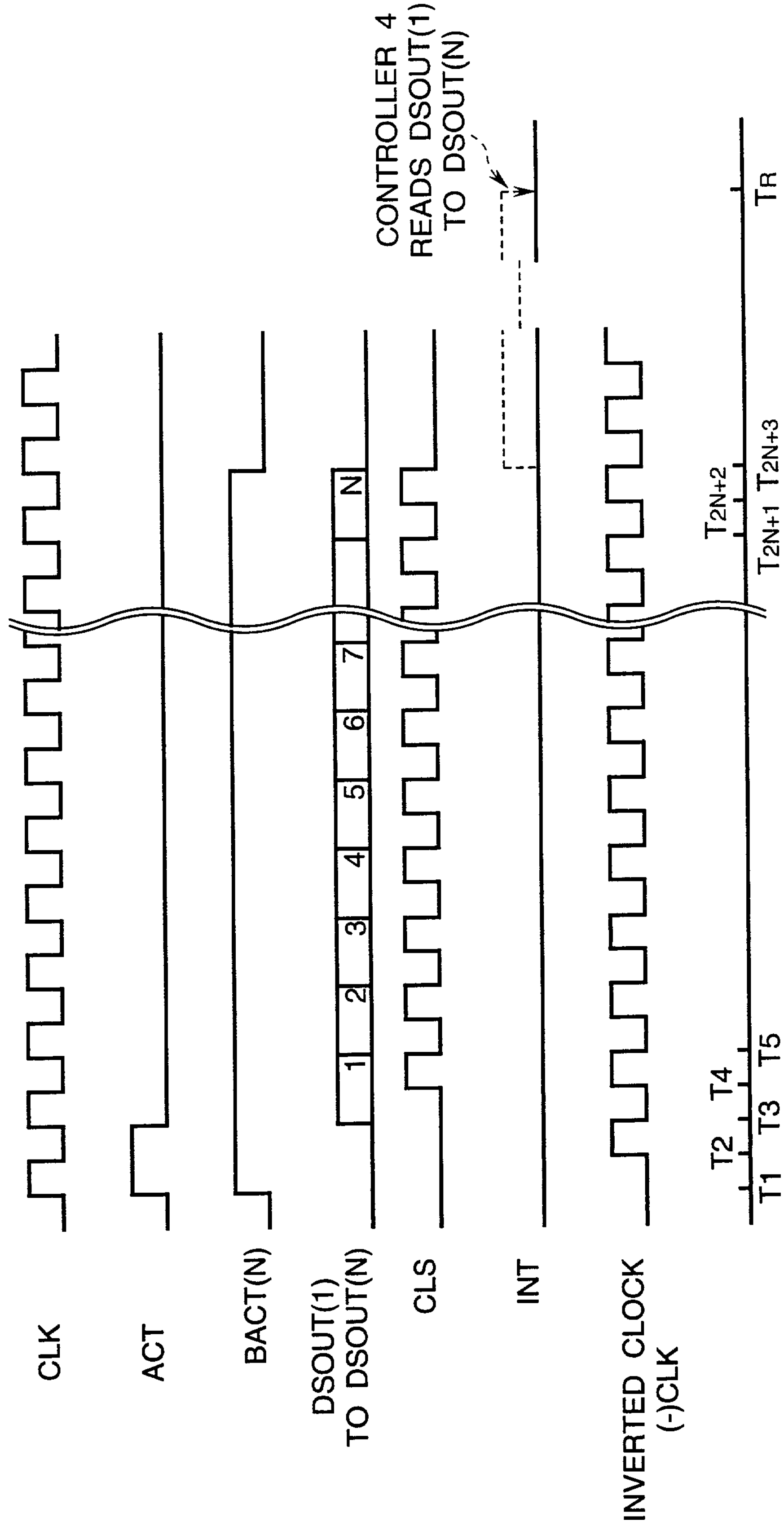
FIG. 12 illustrates the operation of the fourth embodiment.

FIG. 12 illustrates the operation of the fourth embodiment.

The operation of the fourth embodiment will be described with reference to FIG. 12.

When the main control board 45 is powered on, a reset signal Rs activates the initialization of the memory areas A, B, and C. At the same time, the controller 4 causes the R/W controller 54 to send the load signal to the counter 51 so that the counter 51 is set for a value of N (i.e., the number of sensor boards DSB). After the above initialization procedure is completed, the first monitoring cycle begins as follows:

At time $T_1$, the sample clock generator 52 receives the first activation signal ACT from the controller 4 while at the same time receiving the board active signal BACT(N) from the digital sensor board DSB(N).

At time $T_3$, the activation signal ACT goes low. The digital sensor board DSB(N) provides the first one of the digital sensor output signals DSOUT(1)–DSOUT(N) to the memory area A. At the same time, the sample clock generator 52 opens its gate.

At time $T_4$, the sample clock generator 52 starts to output the sensor sample clock CLS. The digital sensor output signal DSOUT(1) of the train of the digital sensor output signals DSOUT(1)–DSOUT(N) is stored into the memory area A on the rising edge of the sensor sample clock CLS.

From time $T_5$ to time $T_{2N+2}$, the sample sensor clock generator 52 continues to output the sensor sample clock CLS until the total number of clock pulses reaches N. The digital sensor output signals DSOUT(2)–DSOUT(N) are stored into the memory area A on the rising edges of the sensor sample clocks CLS.

At time $T_{2N+3}$, the board active signal BACT(N) and digital sensor sample clock CLS go off.

The first cycle of the monitoring operation of digital sensor output signals DSOUT(1)–DSOUT(N) is completed.

The second cycle of the monitoring operation will be described with reference to FIG. 12.

At time $T_1$, the sample clock generator 52 receives the activation signal ACT from the controller 4 while at the same time receiving the board active signal BACT(N) from the digital sensor board DSB(N). The controller 4 controls the R/W controller 54 to transfer the train of the digital sensor output signals DSOUT(1)–DSOUT(N) of the first cycle, stored in the memory area A, to the memory areas B and C. The train of the digital sensor output signals DSOUT (1)–DSOUT(N) is transferred in the form of parallel data.

From time $T_3$ to time $T_{2N+2}$, just as in the first cycle, the digital sensor board DSB(N) provides the train of the digital sensor output signals DSOUT(1)–DSOUT(N) of the second cycle to the memory area A on the rising edges of the sensor sample clocks CLS.

At time $T_{2N+3}$, the board active signal BACT(N) and sensor sample clock CLS go off. At the same time, the interruption generator 53 compares the content of the memory area A with the content of the memory area B to determine whether the contents coincide. In other words, the interruption generator 53 compares the most up-to-date sensor output signals with that of the preceding cycle. If the two contents do not coincide, the interruption generator 53 provides the interruption signal INT to the controller 4. In response to the interruption signal INT, the controller 4 controls the R/W controller 5 to transfer the sensor output signals of the second cycle from the memory area A to the memory areas B and C. The sensor output signals are transferred in the form of parallel data. If the two contents coincide, the interruption generator 53 does not generate the interruption signal INT.

The aforementioned operation is repeated every time the controller 4 provides the activation signal ACT to the digital sensor board DSB(1). It is to be noted that the controller 4 receives the most-up-to-date train of digital sensor output signals DSOUT(1)–DSOUT(N) only when the most-up-to-date train of digital sensor output signals DSOUT(1)–DSOUT(N) differs from that of the preceding cycle.

The controller 4 may be programmed to selectively receive a desired one from among the digital sensor output signals DSOUT(1)–DSOUT(N).

The fourth embodiment has the following advantages.

(1) Since the controller receives the train of the sensor output signals only when the most up-to-date train of the sensor output signals do not coincide with the train of the sensor output signals of the preceding cycle, therefore the jobs imposed on the controller 4 may be alleviated.

(2) Implementing the aforementioned system by hardware permits the system to operate at increased clock frequencies.

(3) The controller may be allowed to receive only a particular one of the sensor output signals, so that the jobs imposed on the controller 4 is alleviated.

Fifth Embodiment

The first to fourth embodiments have been described with reference to digital type sensors such as photo interrupters and reflection type photo sensors. However, analog sensors may be incorporated in some apparatuses. In order to address such a case, the control circuit according to a fifth embodiment has the following configuration.

Figure 13:
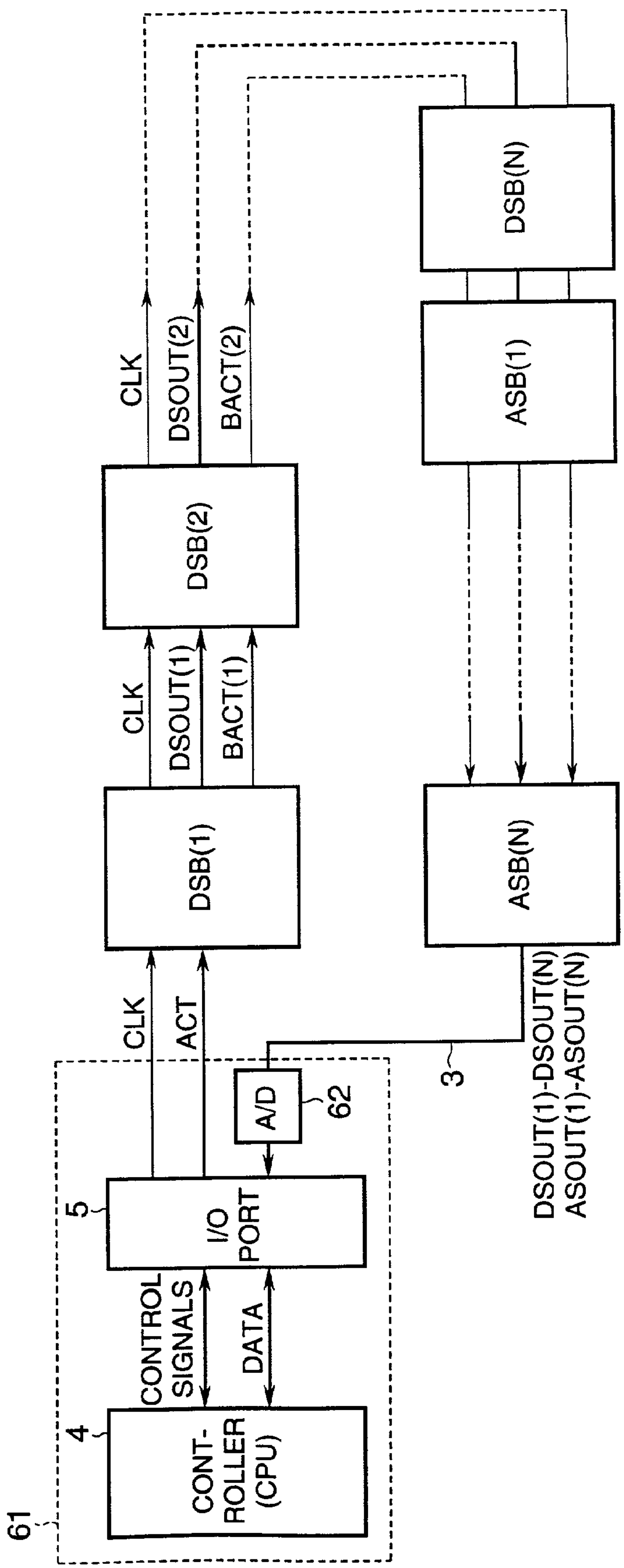
FIG. 13 is a block diagram of a fifth embodiment.

FIG. 13 is a block diagram of the fifth embodiment.

The control circuit according to the fifth embodiment includes a main control board 61, digital sensor boards DSB(1)–DSB(N), analog sensors boards ASB(1)–ASB(N), and wires 3, which are connected in cascade. The number of the digital sensor boards may be different from the number of the analog sensor boards.

The main control board 61 is connected to the first one of the cascaded digital sensor boards DSB(1)–DSB(N) and the final one of the cascaded analog sensor boards ASB(1)–ASB (N). The main control board 61 includes the controller 4, I/O port 5, and an A/D converter 62, which are connected via the bus.

The controller 4 is in the form of a CPU that performs the overall control of the control circuit. The controller 4 provides the activation signal ACT to the digital sensor board DSB(1) and receives the train of digital sensor output signals SOUT(1)–DSOUT(N) and ASOUT(1)–ASOUT(N), thereby performing required controls.

The I/O port 5 receives the control signals (e.g., activation signal ACT) from the controller 4, and provides the control signals to the digital sensor board s DSB(1)–DSB(N) and analog sensor boards ASB(1)–ASB(N). The I/O port 5 also receives the data (e.g., sensor output signals) from the analog sensor board ASB (N), and transfers the data to the controller 4.

The digital sensor boards DSB(1)–DSB(N) incorporate digital sensors such as photo interrupter and sensor control circuits. The digital sensor boards DSB(1)–DSB(N) detect, for example, the presence and absence of the recording paper and originals.

The analog sensor boards ASB(1)–ASB(N) incorporate sensor controlling circuits and analog sensors such as a thermistor, and generate sensor outputs having different signal levels in accordance with changes in the ambient conditions (temperature and humidity, etc.) within the equipment.

Figure 14:
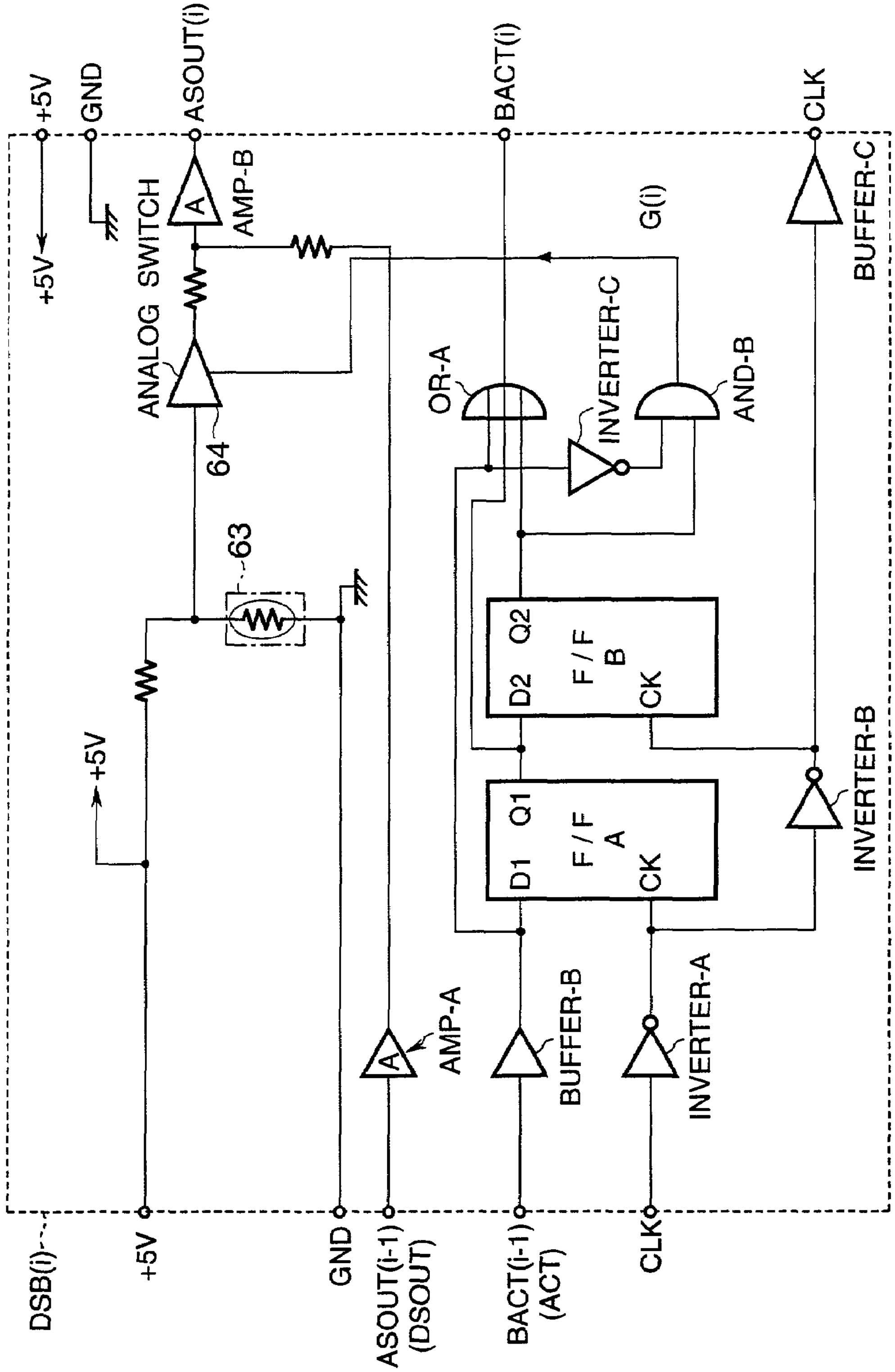
FIG. 14 is a schematic diagram of the analog sensor board according to the fifth embodiment.

FIG. 14 is a schematic diagram of one of the analog sensor boards ASB(1)–ASB(N).

The analog sensor boards ASB(1)–ASB(N) includes a sensor 63, an analog switch 64, amplifiers A and B, flip-flops A and B, buffers B and C, inverters A, B, and C, an OR gate A, and an AND gate B. The analog sensor output signals ASOUT(1)–ASOUT(N) are generated in the same manner as the digital sensor output signals DSOUT(1)–DSOUT(N).

The sensor 63 detects a corresponding condition e.g., the temperature within the equipment and provides an analog sensor output signal having a magnitude indicative of the temperature to the analog switch 64.

The analog switch 64 is a switch controlled by the sensor gate signal G(i), and passes the output of the sensor 63 to the amplifier B. The amplifier A receives the analog sensor output signal ASOUT(i−1) from the preceding analog sensor board ASB(i−1) and sends it to the amplifier B. The amplifier A also receives the digital sensor output signals DSOUT (1)–DSOUT(N) from the digital sensor board.

The amplifier B receives the analog sensor output signal ASOUT(i−1) through the amplifier A and then provides ASOUT(i) to the following analog sensor board ASB(i+1). Then, the amplifier B receives the output of the analog switch 64, and sends it as one of the sensor output signals DSOUT(1)–DSOUT(N) and ASOUT(1)–ASOUT(i) to the following analog sensor board ASB (i+1). It is to be noted that the resultant net amplification factor of the amplifiers A and B is usually set to 1.

The rest of the construction is the same as that of the first embodiment and the description thereof is omitted.

Figure 15:
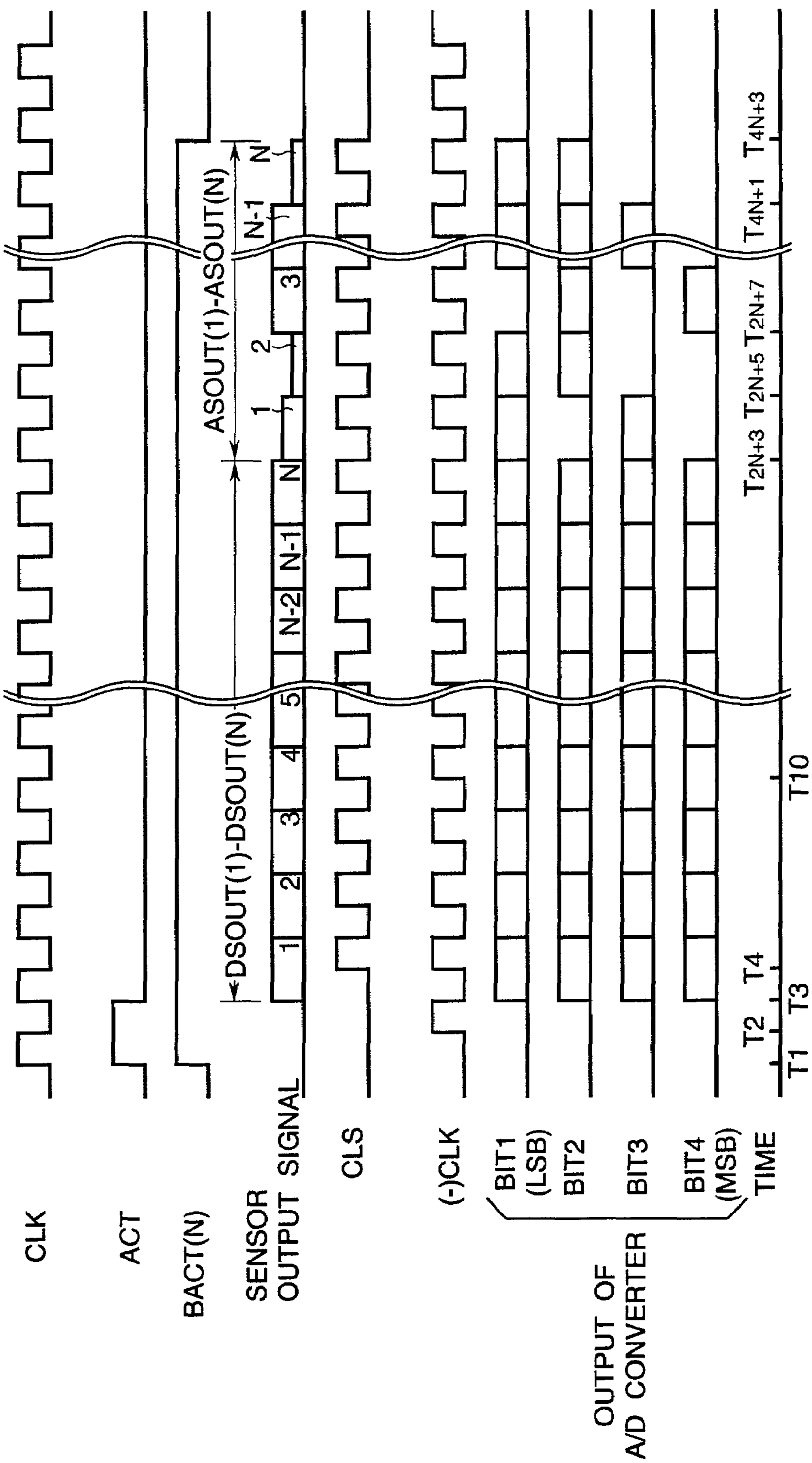
FIG. 15 is a timing chart illustrating the operation of the fifth embodiment.

FIG. 15 is a timing chart illustrating the operation of the fifth embodiment.

The fifth embodiment will be described with respect to a part different from the first embodiment.

While the first embodiment involves only the train of the digital sensor output signals in digital form (i.e., DSOUT (1)–DSOUT(N)), the fifth embodiment involves not only the train of the digital sensor output signals DSOUT(1)–DSOUT(N) in digital form but also the train of the analog sensor output signals ASOUT(1)–ASOUT(N)

that have different analog levels. The fifth embodiment differs from the first embodiment in that the output of the analog sensor board ASB(N) is directed via the A/D converter 62 to the I/O port 5.

The operation of the A/D converter 62 will be described. The A/D converter 62 is a four-bit analog-to-digital converter.

From times $T_3$ to $T_{10}$ the A/D converter 62 receives the train of the digital sensor output signals DSOUT(1)–DSOUT(N) and ASOUT(1)–ASOUT(N) from the analog sensor board ASB(N), and converts the received signals from analog form to digital form. The digital signals are provided to the I/O port 5. The digital sensor output signals DSOUT(1)–DSOUT(4) are digital signals and therefore the bits 1–4 of the A/D converter are high levels if the sensors are in a normal state.

From time $T_{2N+3}$ to time $T_{4N+3}$, the A/D converter 62 receives the analog sensor output signals ASOUT(1)–ASOUT(N) from the analog sensor board ASB (N). Since the analog sensor output signals ASOUT(1)–ASOUT(N) are analog signals, therefore the bits 1–4 of the A/D converter generate either high or low levels in accordance with the levels of the analog signals.

At time $T_{4N+3}$, the board active signal BACT(N) of the analog sensor board ASB(N) goes off. At the same time, the sample clock generator 52 completes outputting as many pulses as there are the digital and analog sensor boards connected in cascade. As a result, the controller 4 completes receiving the bits 1, 2, 3, and 4 from the A/D converters 62. The controller 4 performs required control operations upon receiving these bits 1, 2, 3, and 4.

In the fifth embodiment, a group of the digital sensor output boards DSB(1)–DSB(N) and a group of analog sensor boards ASB(1)–ASB(N) are cascaded. The respective sensor boards may be inserted in random order. For example, one of analog sensor boards ASB(1)–ASB(N) may be placed between digital sensor boards DSB(i) and DSB (i+1), in which case, the controller 4 is correspondingly reprogrammed to correctly identify the analog and digital data, thereby eliminating chance of the data being read and identified erroneously. The analog data and digital data may be distinguished from each other by, for example, setting different signal levels for analog data and digital data.

The fifth embodiment provides the following advantages.

Adding the A/D converter in front of the I/O port allows connection of analog sensor to the sensor board, thereby providing a wide range of applications.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A control circuit for use in an apparatus, comprising:

a plurality of sensor boards connected in cascade so that said plurality of sensor boards define a signal path that runs through the plurality of sensor boards, each of said plurality of sensor boards being connected to a corresponding sensor and providing a sensor output of the corresponding sensor to the signal path; and a main control board connected to a first one of said plurality of sensor boards and to a final one of the plurality of sensor boards;

wherein when said main control board provides a first signal to the first one of the plurality of sensor boards, each of said plurality of sensor boards provides the sensor output onto the signal path at a predetermined timing and said main control board receives the sensor output at the predetermined timing, the sensor output signal being output in an order in which the plurality of sensors are connected in cascade.

2. The control circuit according to claim 1, wherein when a preceding one of two consecutive sensor boards of said plurality of sensor boards is active, the preceding one provides a second signal to a following one of the two consecutive sensor boards;

wherein when the preceding one does not provide the second signal to the following one, the following one provides a corresponding sensor output onto the signal path.

3. The control circuit according to claim 2, wherein when the preceding one provides the second signal to the following one, said main control board receives the sensor output of the preceding one.

4. The control circuit according to claim 1, wherein the sensor is a digital sensor.

5. The control circuit according to claim 1, further comprising an analog-to-digital converter;

wherein the sensor is an analog sensor that generates an analog sensor output and said analog-to-digital converter converts the analog sensor output into a digital signal.

6. The control circuit according to claim 1, wherein each of said plurality of sensor boards includes the sensor on one side thereof and a bare 1C chip on the other side, the bare 1C chip incorporating all of the required circuits.

7. The control circuit according to claim 1, wherein each of said plurality of sensor boards includes an input that receives an incoming signal and a terminator connected to the input, the terminator setting an input impedance of the input.

8. The control circuit according to claim 1, further comprising a sensor check circuit;

wherein said main control board provides the first signal to the first one of said plurality of sensor boards to activate a cycle of receiving a train of sensor outputs from the final one of said plurality of sensor boards;

wherein said sensor check circuit determines whether the train of sensor outputs of a preceding one of two consecutive cycles is different from the train of sensor outputs of a following one of the two consecutive cycles;

wherein if the train of sensor outputs of the following one of the two consecutive cycles is different from the train of sensor outputs of the preceding one of the two consecutive cycles, said sensor check circuit provides a third signal to said main control board so that said main control board performs a predetermined control operation.

* * * * *